(12) United States Patent
Blake et al.

(10) Patent No.: US 9,003,127 B2
(45) Date of Patent: *Apr. 7, 2015

(54) STORING DATA IN A SYSTEM MEMORY FOR A SUBSEQUENT CACHE FLUSH

(71) Applicant: International Business Machines Corporation, Armonk, NY (US)

(72) Inventors: Michael A. Blake, Wappingers Falls, NY (US); Timothy C. Bronson, Round Rock, TX (US); Hieu T. Huynh, Austin, TX (US); Kenneth D. Klapproth, Austin, TX (US); Pak-Kin Mak, Poughkeepsie, NY (US); Vesselina K. Papazova, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/086,308

(22) Filed: Nov. 21, 2013

(65) Prior Publication Data

US 2014/0082289 A1 Mar. 20, 2014

Related U.S. Application Data

(63) Continuation of application No. 13/495,383, filed on Jun. 13, 2012.

(51) Int. Cl.
*G06F 12/08* (2006.01)
*G06F 12/12* (2006.01)

(52) U.S. Cl.
CPC .......... *G06F 12/0895* (2013.01); *G06F 12/128* (2013.01); *G06F 12/0891* (2013.01); *G06F 12/0804* (2013.01); *G06F 12/0817* (2013.01)

(58) Field of Classification Search
CPC G06F 12/128; G06F 12/0864; G06F 12/0891
USPC .................................................. 711/135, 128
See application file for complete search history.

(56) References Cited

U.S. PATENT DOCUMENTS

| 5,860,105 | A | * | 1/1999 | McDermott et al. | 711/135 |
|---|---|---|---|---|---|
| 6,141,731 | A | * | 10/2000 | Beardsley et al. | 711/136 |
| 6,378,047 | B1 | * | 4/2002 | Meyer | 711/135 |
| 6,976,128 | B1 | * | 12/2005 | Williams et al. | 711/135 |
| 7,472,230 | B2 | * | 12/2008 | Prabhu | 711/143 |
| 2004/0158681 | A1 | * | 8/2004 | Hooker | 711/143 |
| 2004/0215886 | A1 | * | 10/2004 | Cargnoni et al. | 711/135 |
| 2006/0184745 | A1 | * | 8/2006 | Tan | 711/143 |
| 2009/0198710 | A1 | * | 8/2009 | Acedo et al. | 707/100 |
| 2011/0072199 | A1 | * | 3/2011 | Reiter et al. | 711/103 |
| 2012/0317367 | A1 | * | 12/2012 | Grayson et al. | 711/143 |

* cited by examiner

*Primary Examiner* — Hal Schnee
(74) *Attorney, Agent, or Firm* — Cantor Colburn LLP; Margaret McNamara

(57) ABSTRACT

Embodiments relate to storing data to a system memory. An aspect includes accessing successive entries of a cache directory having a plurality of directory entries by a stepper engine, where access to the cache directory is given a lower priority than other cache operations. It is determined that a specific directory entry in the cache directory has a change line state that indicates it is modified. A store operation is performed to send a copy of the specific corresponding cache entry to the system memory as part of a cache management function. The specific directory entry is updated to indicate that the change line state is unmodified.

9 Claims, 6 Drawing Sheets

TABLE 1:    OWNERSHIP TAG FIELD

VALUE       DESCRIPTION

INVALID  -  DIRECTORY ENTRY IS NOT VALID

UNOWNED  -  DIRECTORY ENTRY IS VALID IN THE CACHE
            30, AND A COPY OF DATA DOES NOT EXIST
            IN ANY OF THE PROCESSOR UNITS 24

OWNED    -  DIRECTORY ENTRY IS VALID IN THE CACHE
            30, AND A COPY OF DATA MAY ALSO EXIST
            IN ONE OR MORE OF THE PROCESSOR UNITS 24

FIG. 4

TABLE 2:    CHANGE LINE STATE FIELD

VALUE       DESCRIPTION

UNMODIFIED - DATA HAS NOT BEEN MODIFIED SINCE BEING
             ACCESSED FROM SYSTEM MEMORY 20 AND
             INSTALLED IN THE CACHE 30

MODIFIED   - DATA HAS BEEN MODIFIED SINCE BEING
             ACCESSED FROM SYSTEM MEMORY 20 AND
             INSTALLED IN THE CACHE 30

FIG. 5

STORING DATA IN A SYSTEM MEMORY FOR A SUBSEQUENT CACHE FLUSH

CROSS-REFERENCE TO RELATED APPLICATION

This application is a continuation of U.S. patent application Ser. No. 13/495,383, filed Jun. 13, 2012, the content of which is incorporated by reference herein in its entirety.

BACKGROUND

The present invention relates generally to a computing system having a cache and a system memory, and more specifically, to a computing system for storing data from the cache to the system memory in anticipation of a subsequent cache flush.

In a computer system, it may become necessary to evict data from a cache, which is commonly referred to as a cache flush. For example, cache flushes may be necessary during a dynamic storage re-allocation event. As part of the operation of the cache flush, a directory state for each cache location (also referred to as a cache entry) is searched to determine whether the cache location contains valid data, and if so, if the data has been modified since accessed from the system memory of the computer system. Any cache locations that contain valid data that has not been modified since being accessed from the system memory of the computer system may simply have the directory state updated to mark the cache locations as invalid. However, cache locations that contain modified data first have a copy of the data stored back to the system memory before the directory state is updated.

Cache flushes generally need to be performed in a quiesced state (i.e., pausing or altering the state of running processes on the computer system) to avoid re-populating the cache location with new data as the cache flush is being performed. Thus, it is generally important that the cache flush be completed relatively quickly. However, as cache sizes have continued to grow, the amount of time to process all of the entries in the cache has continued to grow as well, which results in a longer period of time processors are in a quiesced state, thus impacting overall system performance.

It should also be noted that while cache sizes continue to grow in size, the size or width and speed of a bus between the cache and the system memory generally has remained about the same. The size and speed of the bus determines how much data may be transferred between the cache and the system memory in given period of time. Thus, saving each cache location to the system memory each time the cache location is updated may become time-consuming due to the limited bandwidth of the bus.

SUMMARY

Embodiments include a method, system, and computer program product for storing data to a system memory. The method includes accessing successive entries of a cache directory having a plurality of directory entries by a stepper engine, where access to the cache directory is given a lower priority than other cache operations. It is determined that a specific directory entry in the cache directory has a change line state that indicates it is modified. A store operation is performed to send a copy of the specific corresponding cache entry to the system memory as part of a cache management function. The specific directory entry is updated to indicate that the change line state is unmodified.

Additional features and advantages are realized through the techniques of the present disclosure. Other embodiments and aspects of the disclosure are described in detail herein and are considered a part of the claimed disclosure. For a better understanding of the disclosure with advantages and features, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 4 depicts a table describing the ownership tag shown in FIG. 3 in accordance with an embodiment;

FIG. 5 depicts a table describing the change line state shown in FIG. 3 in accordance with an embodiment;

DETAILED DESCRIPTION

An embodiment for providing a stepper engine in a cache unit is disclosed. In one exemplary embodiment, the stepper engine marks directory entries in a cache directory as 'Unmodified' in anticipation of a cache flush. Thus, during a cache flush, only a limited amount or substantially no directory entries are present in the cache directory having a 'Modified' change line state. A limited amount or an absence of directory entries in the cache directory having a 'Modified' change line state will in turn reduce the amount of time needed to perform a cache flush. This is because there are a limited amount of directory entries that need to be sent to the system memory first before being marked as 'Unmodified', and subsequently evicted. Therefore, the computing system as described in exemplary embodiments will reduce the time needed to perform a cache flush.

Figure 1:
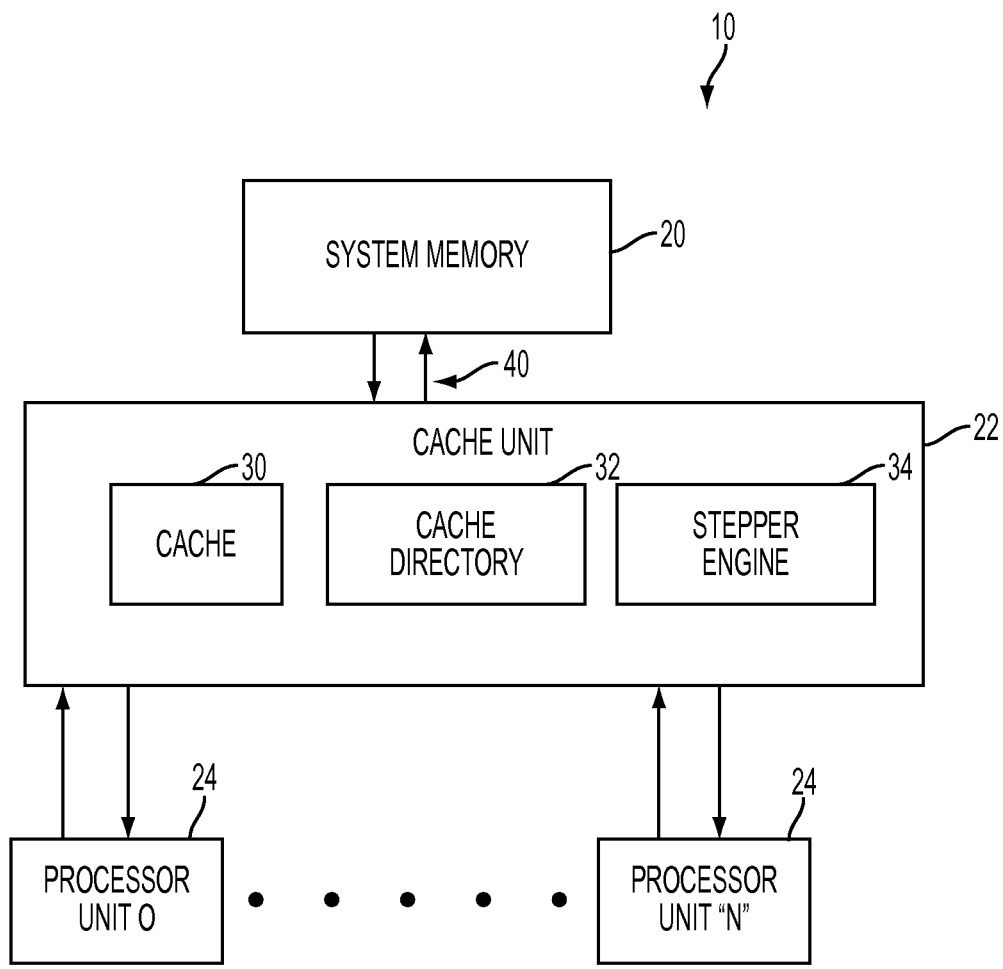
FIG. 1 depicts a computing system in accordance with an embodiment.

FIG. 1 illustrates an example of a computing system 10 in accordance with one embodiment. The computing system 10 includes a system memory 20, a cache unit 22, and at least one processing unit 24. In the embodiment as shown, N+1 processing units 24 are included (e.g., processing unit 0 to processing unit N). The processing units 24 are in communication with the cache unit 22. The cache unit 22 includes a cache 30, a cache directory 32, and a stepper engine 34. The cache unit 22 is in communication with the system memory 20 via a bus 40. The cache 30 stores copies of data from the most frequently used locations in the system memory 20 such that future requests for data from one or more of the processing units 24 may be served faster.

Figure 2:
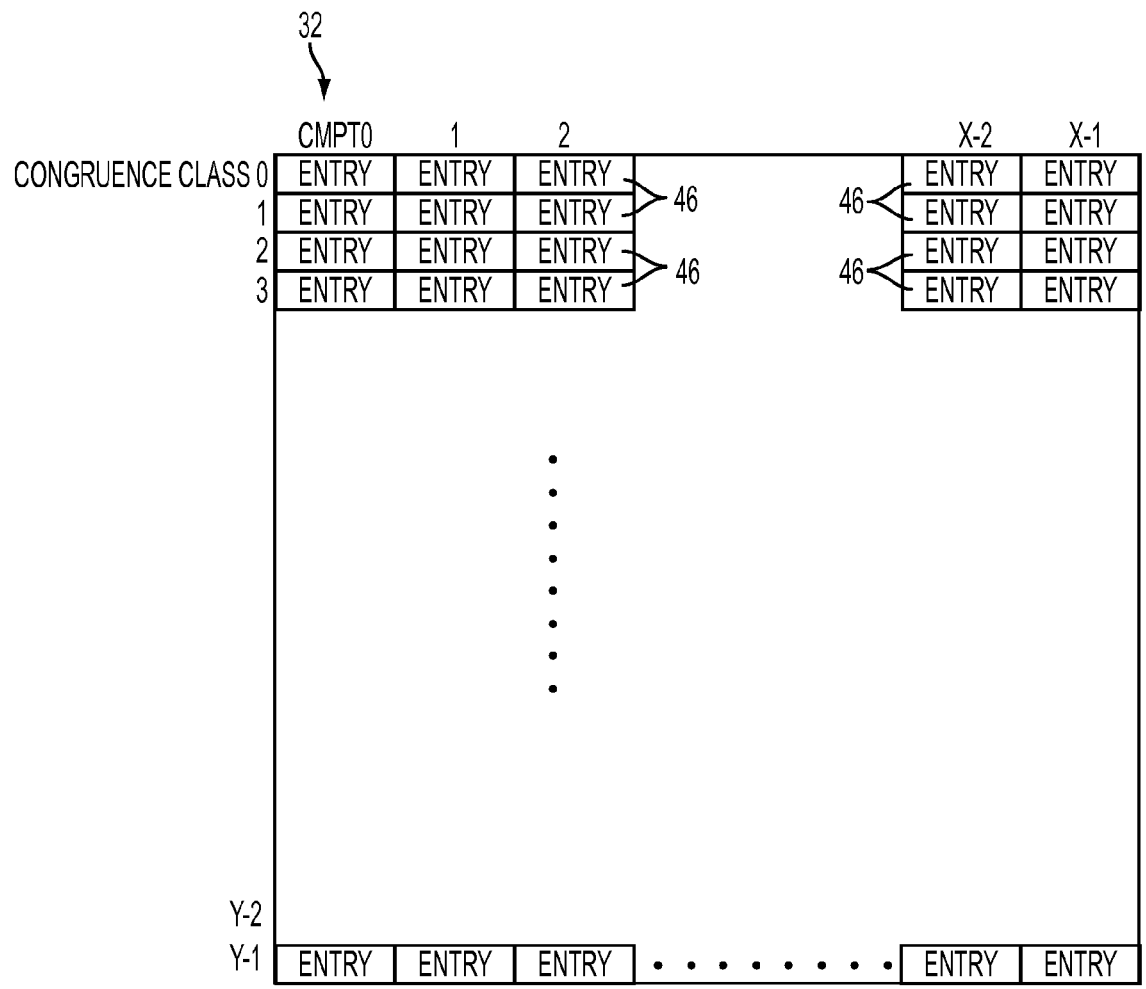
FIG. 2 depicts a cache directory in accordance with an embodiment.

FIG. 2 is an exemplary illustration of the cache directory 32. The cache directory 32 is organized into Y number of congruence classes (ranging from 0 to Y−1) and X number of compartments (ranging from 0 to X−1). A total number of directory entries 46 in the cache directory 32 is equal to Y multiplied by X, where there is one directory entry 46 for each line of data in the cache 30. It should be noted that while an associative cache having Y congruence classes and X number of compartments is described, a direct mapped cache may be used as well.

Figure 3:
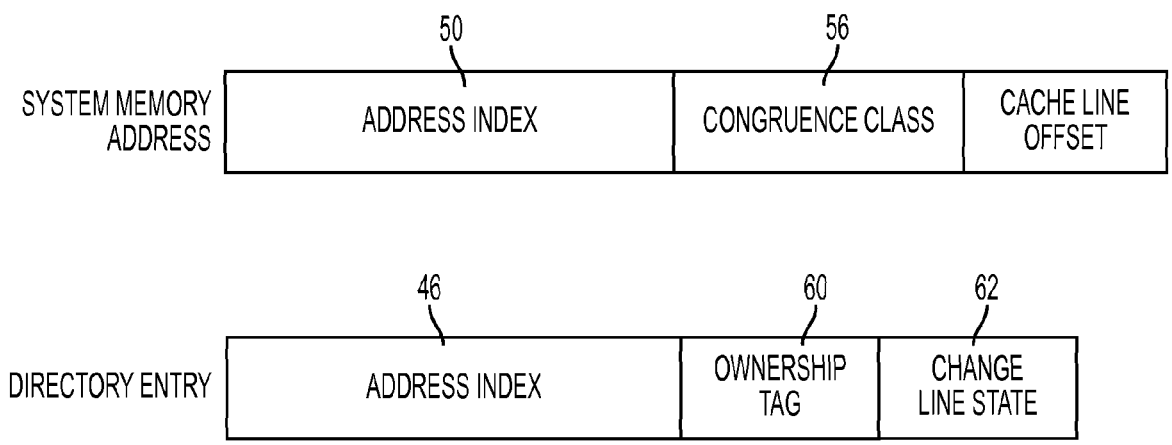
FIG. 3 depicts a mapping of a system memory address to directory entry shown in FIG. 2 in accordance with an embodiment.

FIG. 3 illustrates a mapping of a system memory address 50 to a specific directory entry 46. As shown, a subset of the system memory address bits are used to specify which Y congruency class 56 to access while the remaining (address index) address bits are included as part of the directory entry 46. Each directory entry 46 also includes an ownership tag 60 which indicates the ownership state of the line, and a change line state 62. The change line state 62 indicates whether the corresponding cache entry of directory entry 46 has been modified since the data in the corresponding cache entry contains was last accessed from the system memory 20 (shown in FIG. 1), and installed in the cache 30.

FIG. 4 is a table describing the ownership tag 60 (shown in FIG. 3). Specifically, if the ownership tag 60 is set to 'Invalid' this is an indication that the corresponding cache entry is not valid. If the ownership tag 60 is set to 'Unowned', this is an indication that the corresponding cache entry is valid within the cache 30 (shown in FIG. 1), and that a copy of the data that the corresponding cache entry contains does not exist in any of the processor units 24. If the ownership tag is set to 'Owned', this is an indication that the corresponding cache entry is valid in the cache 30, and a copy of the data it contains may also exist in one of the processing units 24.

FIG. 5 is a table describing the change line state 62 (shown in FIG. 3). If the change line state 62 is 'Unmodified', this is an indication that the data corresponding to the directory entry 46 has not been modified since being accessed from the system memory 20 (shown in FIG. 1) and installed into the cache 30 (shown in FIG. 1). If the change line state 62 is 'Modified', this is an indication that the data corresponding to the directory entry 46 has been modified since being accessed from the system memory 20 and installed into the cache 30.

Referring generally to FIGS. 1-5, the stepper engine 34 initiates a directory lookup of the directory entries 46 located in the cache directory 32. The directory lookup is given a lower priority than other cache operations so as not to interfere with normal system operation of the computing system 10. The stepper engine 34 is first initialized with a current congruence class of 0. The stepper engine 34 then determines if any of the directory entries 46 in the current congruence class (e.g., 0) has a change line state 62 that indicates that a specific one of the directory entries 46 has been modified. Specifically, with reference to FIG. 5, the stepper engine 34 determines if the change line state 62 is 'Modified'. If the change line state 62 of any of the directory entries 46 within the current congruence class is modified, then the stepper engine 34 performs a store operation. During the store operation, a copy of the corresponding data of one of the directory entries 46 having a 'Modified' change line state 62 in the current congruence class is sent to the system memory 20.

In one embodiment, a copy of the corresponding data of one of the directory entries 46 having a 'Modified' change line state 62 is only sent to the system memory 20 if the ownership tag 60 (shown in FIG. 3) is also set to 'Unowned'. This indicates that the copy of the corresponding data for directory entry 46 does not exist in any of the processor units 24 (e.g., in a lower level cache in one of the processing units 24). The stepper engine 34 is relying on the detection of the 'Unowned' ownership tag 60 as an indication that the corresponding data for directory entry 46 is unlikely to be modified again by one of the processing units 24. After a copy of the corresponding data for a directory entry having a 'Modified' change line state 62 is sent to the system memory 20, then the stepper engine 34 updates the change line state 62 from 'Modified' to 'Unmodified'.

If the stepper engine 34 determined that none of the directory entries required a copy of corresponding data to be sent to system memory, the stepper engine 34 increments an internal congruence class register (not shown) by one (e.g., from 0 to 1), wrapping back to 0 if the current congruence class value is Y−1. If the stepper engine 34 determined that one of the directory entries required a copy of corresponding data to be sent to system memory, then the stepper engine 34 leaves the current value in an internal congruence call register (not shown).

The stepper engine 34 waits for a predetermined amount of time, and then repeats the process as described above (e.g., initiating a directory lookup of the directory entries 46 located in the cache directory 32, performing the store operation, and updating the change line state 62 from 'Modified' to 'Unmodified'). The stepper engine 34 conditions the cache directory 32 for a subsequent cache flush. The cache flush evicts the data from the cache 30. Specifically, during a cache flush, the corresponding data of any directory entries having a 'Modified' change line state 62 are first sent to the system memory 20. Then, the ownership tag 60 is set to 'Invalid' and the change line state 62 is set to 'Unmodified'. For directory entries having an 'Unmodified' change line state 62, a cache flush only needs to set the ownership tag 60 to 'Invalid'.

The stepper engine 34 as described will mark the directory entries 46 as 'Unmodified' in anticipation of a cache flush. Thus, during a cache flush, there are usually only a limited number or no directory entries 46 present in the cache directory 32 having a 'Modified' change line state 62. A limited amount or an absence of directory entries 46 in the cache directory 32 having a 'Modified' change line state 62 will reduce the amount of time needed to perform a cache flush, as there are a limited amount of directory entries 46 that need the corresponding data to be sent to the system memory 20 first before being marked as 'Unmodified'.

Figure 6:
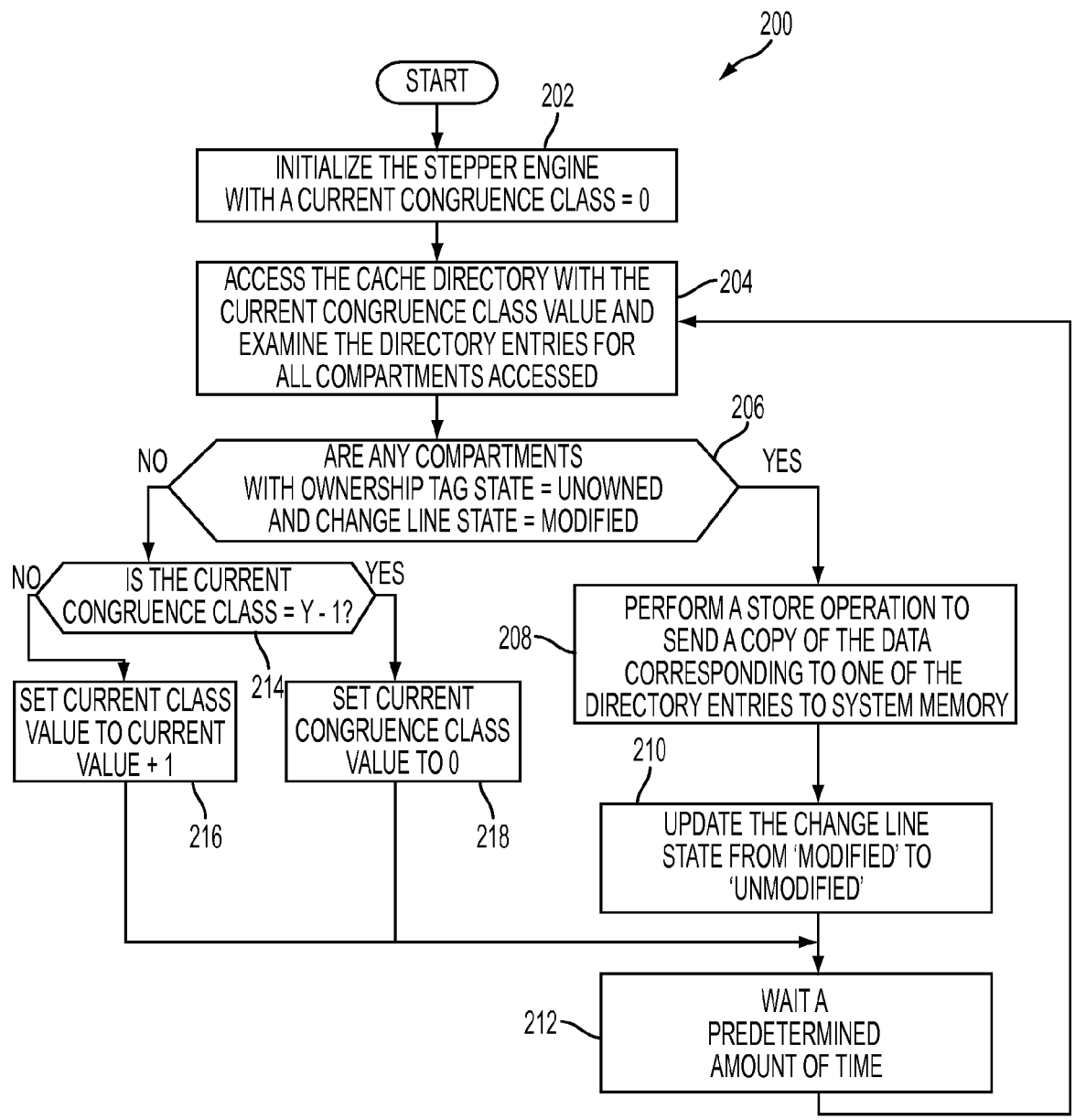
FIG. 6 is a process flow for illustrating an exemplary method of operating the stepper engine in accordance with an embodiment.

FIG. 6 is a process flow diagram illustrating an exemplary method 200 of operating the stepper engine 34 to mark the directory entries 46 as 'Unmodified' in anticipation of a cache flush. Referring now to FIGS. 1-6, method 200 begins at block 202, where the stepper engine 34 is initialized with a current congruence class. In one embodiment, the stepper engine 34 is initialized at a congruence class value of 0. Method 200 may then proceed to block 204.

In block 204, the stepper engine 34 accesses the cache directory 32 with the current congruence class value (e.g., 0) and examines all of the directory entries 46 in the current congruence class for X number of compartments. Method 200 may then proceed to block 206.

In block 206, the stepper engine 34 determines if any compartments in the current congruence class include a change line state 62 that is set to 'Modified'. In addition to the change line state 62, in one embodiment the stepper engine 34 may also determine if the ownership tag 60 is set to 'Unowned'. In the event the change line state 62 is set to 'Modified' and the ownership tag 60 is set to 'Unowned', method 200 may then proceed to block 208.

In block 208, a store operation is executed to send a copy of the corresponding data for one of the directory entries 46 having a 'Modified' change line state 62 in the current congruence class to the system memory 20. Method 200 may then proceed to block 210.

In block 210, the stepper engine 34 updates the change line state 62 for the same directory entry used in block 208 from 'Modified' to 'Unmodified'. Method 200 may then proceed to block 212.

In block 212, the stepper engine 34 waits for a predetermined amount of time. Method 200 may then proceed back to block 204.

Referring back to block 206, in the event the change line state 62 is not set to 'Modified' (e.g., the change line state is 'Unmodified') and the ownership tag 60 is not set to 'Unowned', method 200 may then proceed to block 214. In block 214, the stepper engine 34 determines if the current congruence class is equal to Y−1 (shown in FIG. 2). If the current congruence class is not equal to Y−1, then method 200 proceeds to block 216. In block 216, the current congruence class value is incremented an internal congruence class register (not shown) by one (e.g., from 0 to 1). Method 200 may then proceed to block 212.

If the current congruence class is equal to Y−1, then method 200 proceeds to block 218. In block 218, the current congruence class value is set to zero. Method 200 may then proceed to block 212.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
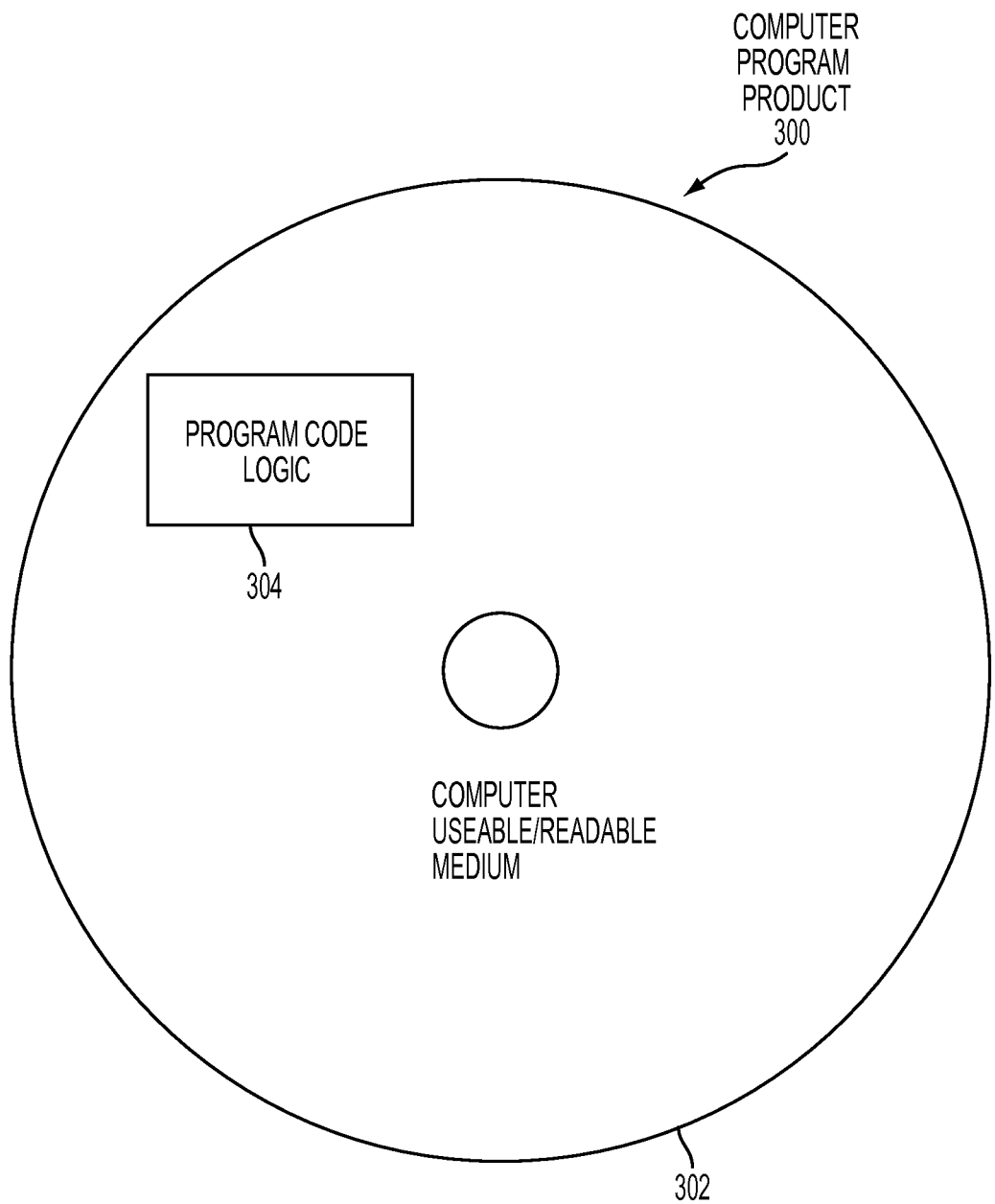
FIG. 7 illustrates a computer program product in accordance with an embodiment.

Referring now to FIG. 7, in one example, a computer program product 300 includes, for instance, one or more storage media 302, wherein the media may be tangible and/or non-transitory, to store computer readable program code means or logic 304 thereon to provide and facilitate one or more aspects of the invention.

Technical effects and benefits include only a limited amount or substantially no directory entries present in the cache directory 32 having a 'Modified' change line state. A limited amount or an absence of directory entries 46 in the cache directory 32 having a 'Modified' change line state will in turn reduce the amount of time needed to perform a cache flush. Thus, the computing system 10 as described in exemplary embodiments will reduce the time needed to perform a cache flush. Moreover, the computing system 10 as disclosed also leaves a copy of the data in the cache-entries in the cache 30 in an unmodified state, and available to any processing units 24 that are part of the computing system 10 prior to a cache flush.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for storing data to a system memory, the method comprising:
   initializing an internal congruence class register;
   accessing a plurality of directory entries of a cache directory of a cache having a plurality of directory entries in a current congruence class of the cache directory that corresponds to the internal congruence class register, the accessing of the plurality of directory entries being given a lower priority than other cache operations in the cache;
   determining that a specific directory entry of the plurality of directory entries in the cache directory has a change line state that indicates that the specific directory entry is modified;
   performing a store operation to send a copy of cache data associated with the specific directory entry to the system memory as part of a cache management function;
   updating the specific directory entry to indicate the change line state is unmodified;
   incrementing the internal congruence class register; and
   initiating an access to a next plurality of directory entries in a next congruence class of the cache directory based on the incremented internal congruence class register;
   further comprising performing the store operation to send the copy of the cache data associated with the specific directory entry to the system memory based on an ownership tag of the specific directory entry being set to an unowned state.

2. The computer implemented method of claim 1 further comprising determining that the specific directory entry of the current congruence class is modified based on any of the plurality of directory entries within the current congruence class of the cache directory having a change line state that indicates the specific directory entry is modified.

3. The computer implemented method of claim 1 further comprising initializing the internal congruence class register to 0 before accessing the plurality of directory entries of the current congruence class of the cache directory.

4. The computer implemented method of claim 1 wherein the internal congruence class register is incremented by one, and further comprising waiting a predetermined amount of time after updating the specific directory entry, before initiating the access to the next plurality of directory entries in the next congruence class of the cache directory based on the incremented internal congruence class register.

5. The computer implemented method of claim 1 wherein the cache directory is one of an associative cache and a direct mapped cache.

6. A computer program product for storing data to a system memory, the computer program product comprising:
   a non-transitory storage medium readable by a processing circuit and storing instructions for execution by the processing circuit for performing a method comprising:
     accessing a plurality of directory entries of a cache directory of a cache having a plurality of directory entries in a current congruence class of the cache directory that corresponds to the internal congruence class register, the accessing of the plurality of directory entries being given a lower priority than other cache operations in the cache;
     determining that a specific directory entry of the plurality of directory entries in the cache directory has a change line state that indicates that the specific directory entry is modified;
     performing a store operation to send a copy of cache data associated with the specific directory entry to the system memory as part of a cache management function;
     updating the specific directory entry to indicate the change line state is unmodified;
     incrementing the internal congruence class register; and
     initiating an access to a next plurality of directory entries in a next congruence class of the cache directory based on the incremented internal congruence class register;
     further comprising performing the store operation to send the copy of the cache data associated with the specific directory entry to the system memory based on an ownership tag of the specific directory entry being set to an unowned state.

7. The computer program product of claim 6 further comprising determining that the specific directory entry of the current congruence class is modified based on any of the plurality of directory entries within the current congruence class of the cache directory having a change line state that indicates the specific directory entry is modified.

8. The computer program product of claim 6 further comprising initializing the internal congruence class register to 0 before accessing the plurality of directory entries of the current congruence class of the cache directory.

9. The computer program product of claim 6 wherein the internal congruence class register is incremented by one, and further comprising waiting a predetermined amount of time after updating the specific directory entry before initiating the access to the next plurality of directory entries in the next congruence class of the cache directory based on the incremented internal congruence class register.

* * * * *